United States Patent [19]

Pekarik

[11] Patent Number: 4,771,088

[45] Date of Patent: Sep. 13, 1988

[54] METHOD OF STABILIZING EPOXY-POLYAMIDE COATINGS

[75] Inventor: Alan J. Pekarik, Parma, Ohio

[73] Assignee: The Glidden Company, Cleveland, Ohio

[21] Appl. No.: 4,624

[22] Filed: Jan. 15, 1987

[51] Int. Cl.4 .......................... C08K 5/19; C08L 63/00; C08L 77/08
[52] U.S. Cl. ..................................... 523/456; 528/93; 528/111.3
[58] Field of Search ........................ 524/249; 523/456; 528/111.3, 93

[56] References Cited

U.S. PATENT DOCUMENTS

| 2,405,965 | 8/1946 | Leekley | 524/249 |
| 2,944,036 | 7/1960 | Floyd | 528/111.3 |
| 3,382,096 | 5/1968 | Boardman | 524/249 |
| 4,189,550 | 2/1980 | Schwarze | 524/249 |

FOREIGN PATENT DOCUMENTS

| 60-47077 | 3/1985 | Japan | 524/249 |

Primary Examiner—C. Warren Ivy
Attorney, Agent, or Firm—Thomas M. Schmitz

[57] ABSTRACT

A method of stabilizing polyamide coatings comprises the addition of an ethoxylated quaternary ammonium chloride compound to the polyamide coating to impart sag resistance to the coating particularly when the coating is applied to upright or vertical surfaces.

7 Claims, No Drawings

METHOD OF STABILIZING EPOXY-POLYAMIDE COATINGS

BACKGROUND OF THE INVENTION

This invention pertains to thermosetting epoxy-polyamide coatings useful in industrial or maintenance coatings, and particularly to a method of stabilizing viscosity and sag resistance properties of such coatings during the catalyzed pot life thereof which is the period after the coating composition has been catalyzed by admixture of the epoxy resin component with the polyamide component. Polymide type coatings typically exhibit a sag problem after being applied to an upright or vertical surface substrate, which is not apparent in similar polyamine type coatings.

Prior art epoxy-polyamide compositions typically are stabilized with respect to sag resistance by the addition of fumed silica or certain clays. Such additives are known as thixotropic agents, including Cab-O-Sil ® fumed silica and Bentone ® clays, which are added to thicken the coatings mixture and impart thixotripic properties to the coatings. However, sag resistance of freshly catalyzed thermosetting coatings often decrease significantly over the entire catalyzed pot life of freshly converted or catalyzed epoxy-polyamide coatings. Typically, over 50% of the initial sag resistance is lost after only half of the catalyzed pot life. Other prior art compositions suggest the inclusion of ethylene glycol and/or glycerine to improve the stability of thermosetting epoxy-polyamide compositions containing fumed silica or clay thixotropic agents. However, only slightly improved sag resistance results along with highly detrimental viscosity increases. Illustrative comparative examples of these prior suggestions appear in the examples hereinafter.

The advantageous physical properties of thixotropic paints are ideally non-drip and splash characteristics, freedom from pigment settling, ease of brushing, and application of thick coats without danger of sagging.

It now has been found that the sag resistance of catalyzed thermosetting epoxy-polyamide compositions can be substantially improved without detrimental increase in viscosity over extended periods of catalyzed pot life by the inclusion of minor amounts of cationic stabilized material. The cationic stabilizing additive comprises a ethoxylated quaternary ammonium chloride salt and preferably added in amounts above 1.0% by weight of the epoxy-polyamide polymer solids. This cationic stabilizer advantageously provides stable post catalyzed sag resistance at a viscosity sufficiently low enough to obtain 75% volume solids at application viscosities. A further advantage of the cationic stabilizer pertains to pigmented compositions where the inclusion of certain pigments in conjunction with the cationic stabilizer of this invention can effectively eliminate the need for inorganic thixotropic agents such as Cab-O-Sil ® fumed silica or Bentone ® clays. Still a further advantage relating to the use of cationic stabilizers in accordance with this invention relates to negligible viscosity change or sag resistance over extended storage life of 4 months or more as well as very stabilized viscosity and sag resistance over normal pot lifes of the catalyzed mixtures in use. These and other advantages shall become more apparent by referring to the detailed description of the invention along with the illustrative examples.

SUMMARY OF THE INVENTION

Briefly, the invention is directed to a coating composition useful in industrial or catalyzed maintenance coatings comprising an epoxy-polyamide binder, and minor amounts of a cationic stabilizer above about 1.0% by weight of the epoxy-polyamide polymer solids. The cationic stabilizer comprises an ethoxylated quaternary ammonium chloride and preferably methylbis(2-hydroxyethyl)octadecylammonium chloride.

DETAILS DESCRIPTION OF THE INVENTION

The invention pertains to stabilized thermosetting epoxy-polyamide compositions containing a cationic additive to impart sag resistance wherein the cationic additive comprises an ethoxylated quaternary ammonium chloride.

Referring first to the sag resistant cationic additive in accordance with this invention, the ethoxylated quaternary ammonium chloride comprises a material represented by the following chemical structure:

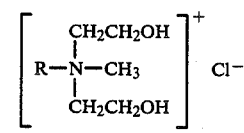

where R is an alkyl chain having between 1 and 24 carbon atoms. The most preferred cationic additives comprise methylbis(2-hydroxyalkyl)alkyl ammonium chloride such as methylbis(2-hydroxyethyl)octadecylammonium chloride. In accordance with this invention, it is believed that the sag resistance compounds are effective by functioning through the cationic structure to form a three dimensional thixotropic network with negatively charged pigments. In this regard, it is speculated that the hydroxyl groups on the ethoxy branches of the cationic additive form hydrogen bonds to further stabilize the epoxy-polyamide polymer in conjunction with the cationic additive. Accordingly, the cationic additive provides a stabilized post catalyzed sag resistance as well as maintaining a low enough viscosity to enable high solids application to a substrate.

Referring next to epoxy resins useful in the epoxy-polyamide polymer mixture, epoxy resins are polyglycidyl ethers of bisphenol A, especially those having 1,2-epoxy equivalency of from about 1.3 to about 2. The molecular weight should be from about 350 to about 20,000, and should be above 4,000 and preferably from about 4,000 to about 10,000. Molecular weights can be measured by GPC (gel permeation chromatography). Although high molecular weight commercial epoxy resins are sometimes convenient to use, a more practical method is to start with bisphenol A and the diglycidyl ether of bisphenol A, whereby the molecular weight of a liquid epoxy resin can be increased to a level that is more satisfactory for many coating applications by reacting liquid epoxy resin with additional bisphenol A or other polyalcohol materials.

The epoxy resin, ordinarily can be a mixture of monoepoxide and diepoxide. The epoxy polymer can be conventional epoxy polymers produced by a condensation reaction of epichlorohydrin or dichlorohydrin with bisphenols or polyhydric phenols, polyalcohols, polyfunctional halohydrins, and certain polyepoxides. The preferred epoxy polymers are produced by coreacting epichlorohydrin or dichlorohydrin with bisphenol-A to provide linear epoxy polymers having pendant epoxide groups. The most preferred epoxy polymers are epichlorohydrin reacted with bisphenol-A. The epoxy polymer can contain between 2 and 25 monomer units and preferably between 3 and 20 copolymerized monomer units (bisphenol-A) wherein the resulting epoxy polymer preferably a diepoxide polymer adapted to coreact with polyamide resin in a catalyzed thermosetting mixture.

Referring next to polyamide resins, polyamides are low molecular polymers containing reactive amino groups adapted to be activated and become coreactive with epoxy resin. Polyamides are polycondensation products wherein the recurring or linking unit is the amide gouping —CONH—. Many methods of producing polyamide are known although most methods are based on a dihydration reaction occurring between organic carboxylic acid and amine upon heating. For instance, heating a simple dicarboxylic acid with equal equivalents of a simple aliphatic diamine produces substantially a linear polyamide where excess equivalents can produce a branched polyamide. A similar reaction can occur between monoamines and dicarboxylic acid, monocarboxylic acids and diamines, and between di- or polyamines and di- or polybasic acids. Sufficient aliphatic chains between functional groups promotes polymer formation. A wide variety of polyamides are possible since these can be based on a wide variety of polyamines and polybasic acids as well as mixtures of two or more of these essential reactants. Modifications are possible in functionality as well as in number of reactants, and in addition polyamides, linear or branched, can be effectively chain-terminated by any one of a large number of monobasic acids or monoamines. The end groups in polyamide resins can be amine groups, carboxylic acid groups, or both. Lower molecular weight branched polymers on the other hand, possess a relatively large content of end groups. For example, dimer or trimer fatty acids, such as dimerized linoleic acid, can be coreacted with branched chain polyamines such as diethylene triamine. By adjusting the relative equivalents of the respective reactants, a wide range of relatively low molecular weight polyamide resins can be formulated. The reaction can be carried out in a stainless steel vessel fitted with an inert gas line, agitator and condenser. By heating together, for example, dimer acid and ethylene diamine solution in an atmosphere of nitrogen with constant agitation, water is evolved first from the ethylene diamine solution and then, as the temperature rises, from the dehydration reaction itself. Heating is continued until the temperature approaches 200° C., water being allowed to escape through the condenser. As the product becomes resinous it is checked at intervals until the desired acid value, amine number and viscosity have been reached whereupon the resulting polyamine resin can be thinned with an organic solvent if necessary to provide a fluid resin material. Polyamides useful in thermosetting compositions preferably contain at least two reactive amide groups per polymer molecule to facilitate cross-linking. Suitable polyamides typically have molecular weights up to about 10,000 and preferably between 100 and 5,000. The polyamine number (value) desirably is between 75 and 750 mg koh/gm. The free amine groups in the condensed polyamide resin provide cross-linking sites for catalytic coreaction with epoxy resin. Polyamide resin, especially those containing a branched chain structure and multiplicity of primary amino end groups are particularly useful in a cross-linking reaction with epoxy resin. A wide range of weight ratios of polyamide resins to epoxy resin can be utilized and advantageously can range between 15% and 100% polyamide based on the weight of epoxy resin.

The epoxy-polyamide compositions can be pigmented by grinding pigments into either or both the epoxy and polyamine resins. Useful pigments can ordinarily include opacifying pigments such as titanium dioxide, zinc oxide, leaded zinc oxide, titanium calcium, as well as tinting pigment such as carbon black, yellow oxides, brown oxides, tan oxides, raw and burnt sienna or umber, chromium oxide green, phtalocyanine green, phthalonitrile blue, ultra-marine blue, cadmium pigments, chromium pigments, and the like. Filler pigments such as clay, silica, talc, mica, woolastonite, wood flower and the like can be added. Conventional thixotropic agents such as fumed silica or certain Bentone clays can be added, although an advantage of this invention is that such mineral additives are not required if the cationic stabilizer is used in accordance with this invention.

The merits of this invention are further illustrated by the following examples.

EXAMPLE 1

As a primary example of this invention, two component epoxy/polyamide coatings were prepared as follows:

| Raw Material | Epoxy/Polyamides Made with Different Thixotropes | |
|---|---|---|
| | Paint-A Part/100 | Paint-B Part/100 |
| Polyamide (Ciba XU-283) | 15.15 | 15.40 |
| Fumed Silica (CAB-O-SIL ® M-5) | — | 1.39 |
| Methylbis (2-hydroxy ethyl) octadecyl Ammonium Chloride | 0.65 | — |
| $TiO_2$ (Glidden Zopaque RCL-9) | 15.00 | 15.23 |
| Talc (Pfizer CP-20-20) | 13.23 | 9.60 |
| Aliphatic Solvents | 4.06 | 6.62 |
| Aromatic Solvents | 8.26 | 8.52 |
| Epoxy (Celanese Epi-REZ 242) | 43.65 | 43.24 |

When mixed, the following Leneta sag resistance values were measured during the pot life.

TABLE I

| | Sag Resistance After Catalyzation | |
|---|---|---|
| | Leneta Sag | |
| Time after Mixing (hrs.) | Paint-A | Paint-B |
| 0 | 20 | 40 |
| 1 | 20 | 10 |
| 2 | 20 | 8 |
| 3 | 20 | — |
| 4 | 25 | — |

EXAMPLE 2

The sag resistance of freshly converted epoxy/polamide coatings decreases significantly over the entire catalyzed pot life. With conventional thixotropes (i.e., CAB-O-SIL ®) or Bentones ®) over 50% of the initial sag resistance is often lost after only 1–2 hours into the pot life. (See Table II).

TABLE II

| | Sag Resistance After Catalyzation | | |
| --- | --- | --- | --- |
| | Leneta Sag Resistance (Mils) | | |
| Time After Mixing (Hrs.) | 1.4% CAB-O-SIL ® | 2.1% CAB-O-SIL ® | 1.4% SD-2 ® |
| 0 | 40 (1320 cps.) | 40 (2500 cps) | 16 (1580 cps) |
| 1 | 10 | 25 | 8 |
| 2 | 8 | 8 | 5 |

See paint B in Example 1 with designated thixotrope substitutions.

Additives such as ethylene glycol and glycerin have been used as "stabilizers" for the above mentioned thixotropes with only little improvement. (See Table III below). Viscosity is also significantly increased.

TABLE III

| | Sag Resistance After Catalyzation vs. Time | |
| --- | --- | --- |
| | Leneta Sag (Mils) | |
| Time After Mixing (Hrs.) | Formula B + 1% Ethylene Glycol | Formula B + 0.3% Glycerin |
| 0 | 40 | 40 |
| 1 | 25 | 30 |
| 2 | 12 | 15 |

The cationic methyl (2-hydroxyethyl)alkyl ammonium chloride compound provides stable post catalyzed sag resistance at a viscosity low enough to obtain 75% volume solids at application viscosity. In addition, when this cationic compound is combined with specific pigmentation, it can eliminate the need for any CAB-O-SIL ® or Bentone ® and is quite economical. The effective level is a minimum of 9 lbs./100 gal., and is very stable during storage, showing little change in viscosity or sag resistance over a period of 4 months. (See Table IV).

TABLE IV*

| Stormer | Initial | 4 Months (Ambient) | 4 Months @ 120° F. |
| --- | --- | --- | --- |
| Viscosity | 123 KU | 124 KU | 20 KU |
| Catalyzed Leneta Sag Resistance (Mils) | 20 | 20 | 20 |

*1.3% Ethoxylated Quarternary Ammonium Chloride (See Paint A).

The foregoing describes a stabilized thixotropic composition but is not intended to be limiting except as defined in the appended claims.

I claim:

1. In a method of stabilizing a thermosetting polyamide coating composition, the improvement comprising:
providing a polymeric mixture of an aminopolyamide and an epoxy resin adapted to coreact to form a thermoset polymer where the polymeric mixture contains at least 1% by weight of a rheology stabilizing additive consisting of an ethoxylated quaternary ammonium chloride salt;
where said stabilizing additive provides stabilized viscosity and sag resistance of the polymeric mixture during the catalyzed pot life of the polymeric mixture.

2. The method in claim 1 wherein at least about 10% by weight of the stabilizing additive is added based on the polymeric mixture.

3. The method of claim 1 wherein the stabilizing additive is a methylbis(2-hydroxyethyl)alkyl ammonium chloride.

4. The method in claim 1 wherein the stabilizing additive is methylbis(2-hydroxyethyl)octadecylammonium chloride.

5. A stabilized, thermosetting polyamide coating composition comprising a polymeric mixture of an aminopolyamide and an epoxy resin adapted to co-reacted to form a thermoset polymer where the polymeric mixture contains at least 1% by weight of a stabilizing additive consisting of an ethoxylated quaternary ammonium chloride salt of the generalized formula:

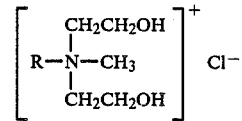

wherein R is an alkyl chain having between 1 and 24 carbon atoms;
where said stabilizing additive stabilizes the viscosity and sag resistance of the polymeric mixture during the catalyzed pot life of the polymeric mixture.

6. The composition in claim 5 wherein the stabilizing additive comprises methylbis(2-hydroxy ethyl)octadecylammonium chloride.

7. The composition in claim 5 wherein the stabilizing additive comprises at least 10 weight parts per 100 weight parts of said polymeric mixture.

* * * * *